United States Patent [19]

Kuge

[11] 4,074,174

[45] Feb. 14, 1978

[54] CONTROLLING APPARATUS FOR ASYNCHRONOUS MOTORS WITH WOUND ROTOR

[75] Inventor: Katutaro Kuge, Mizuhomachi, Japan

[73] Assignee: Tokyo Shibaura Electric Co., Ltd., Kawasaki, Japan

[21] Appl. No.: 653,197

[22] Filed: Jan. 28, 1976

[30] Foreign Application Priority Data

Jan. 31, 1975 Japan ............................. 50-14390[U]

[51] Int. Cl.$^2$ ........................................... H02P 1/26
[52] U.S. Cl. .................................. 318/197; 318/237
[58] Field of Search ............... 318/197, 187, 237, 240, 318/241, 205, 138

[56] References Cited

U.S. PATENT DOCUMENTS 3,144,594  8/1964  Graybeal .............................. 318/197

Primary Examiner—Herman J. Hohauser
Attorney, Agent, or Firm—Oblon, Fisher, Spivak, McClelland & Maier

[57] ABSTRACT

A super-synchronous Scherbius apparatus which enables wound rotor type induction motors to have a smooth speed control below and above the synchronous speed by controlling the secondary power in either the forward or backward direction through the connection of a cyclo-converter on its secondary side includes a first detecting circuit for detecting a signal corresponding to the primary voltage or the rotating magnetic field, a second detecting circuit for detecting a signal corresponding to the position of the rotor, and a calculating circuit for forming a signal corresponding to the phase of the secondary voltage in accordance with the signals of the first and second detecting circuits.

11 Claims, 5 Drawing Figures

CONTROLLING APPARATUS FOR ASYNCHRONOUS MOTORS WITH WOUND ROTOR

BACKGROUND OF THE INVENTION

1. Field of the Invention

This invention relates to controlling apparatus for controlling the speed of a wound rotor type induction motor below and above a synchronous speed thereof.

2. Description of the Prior Art

Recently, there has been constructed a super-synchronous Scherbius apparatus which enables wound rotor type induction motors to have a smooth speed control below and above the synchronous speed by controlling the secondary power in either the forward or backward direction through the connection of a cyclo-converter on the secondary side.

A prior Scherbius apparatus in which the rotor winding is connected to a rectifier comprising a number of diodes does not generate a driving torque at and above the synchronous speed because the secondary current for driving is not generated.

It is known that an induction motor generates a torque obtained by multiplying the induced flux of the rotating magnetic field by the secondary armature current.

If the current can be generated in a winding of the rotor corresponding to the position of the rotating magnetic field, the induction motor can generate the torque even at the synchronous speed.

During such conditions, if the current is larger than the load current, the speed of the induction motor exceeds the synchronous speed.

At that time, the polarity of the secondary armature induced voltage with respect to the position of the rotating magnetic field is reversed, but the current must be set at the same polarity below the synchronous speed in order to rotate the induction motor in the same direction.

Thus, despite speeds below and above the synchronous speed, the super-synchronous Scherbius apparatus generates the torque in the same rotating direction when current of the same polarity as above mentioned is applied to the coil corresponding to the position of the rotating magnetic field and generates a reverse torque when current of reverse polarity is applied. The torque in the same rotating direction acts as a driving torque and the torque in the reverse rotating direction acts as a braking torque.

Accordingly, in the super-synchronous Scherbius apparatus, it is necessary to detect the relative position of the rotor coil with respect to the rotating magnetic field. The relative position can be directly detected by the secondary voltage induced in the rotor.

However, as is known, since the secondary voltage proportional to the slip becomes zero or a very small value at or close to the synchronous speed, the use of the secondary voltage as the detecting signal is improper.

SUMMARY OF THE INVENTION

Accordingly, one object of the invention is to provide a new and improved controlling apparatus for a super-synchronous Scherbius apparatus.

Another object of the invention is to provide a new and improved unique controlling apparatus for a super-synchronous Scherbius apparatus having a secondary voltage phase detection circuit for detecting a signal corresponding to the phase of the secondary voltage at and close to the synchronous speed.

Still another object of the invention is to provide a new and improved unique controlling apparatus for a super-synchronous Scherbius apparatus for enabling a wound rotor type induction motor to have smooth speed control below and above the synchronous speed.

The foregoing and other objects are attained in accordance with one aspect of the present invention through the provision of a controlling apparatus for a super-synchronous Scherbius apparatus which enables a wound rotor type induction motor to have a smooth speed control below and above the synchronous speed which comprises a first detection circuit for detecting a signal corresponding to the rotating magnetic field of the induction motor, a second detection circuit for detecting a signal corresponding to the position of the rotor and a calculating circuit for generating a signal corresponding to the phase of the secondary voltage in accordance with the signals of the first and the second detection circuits.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
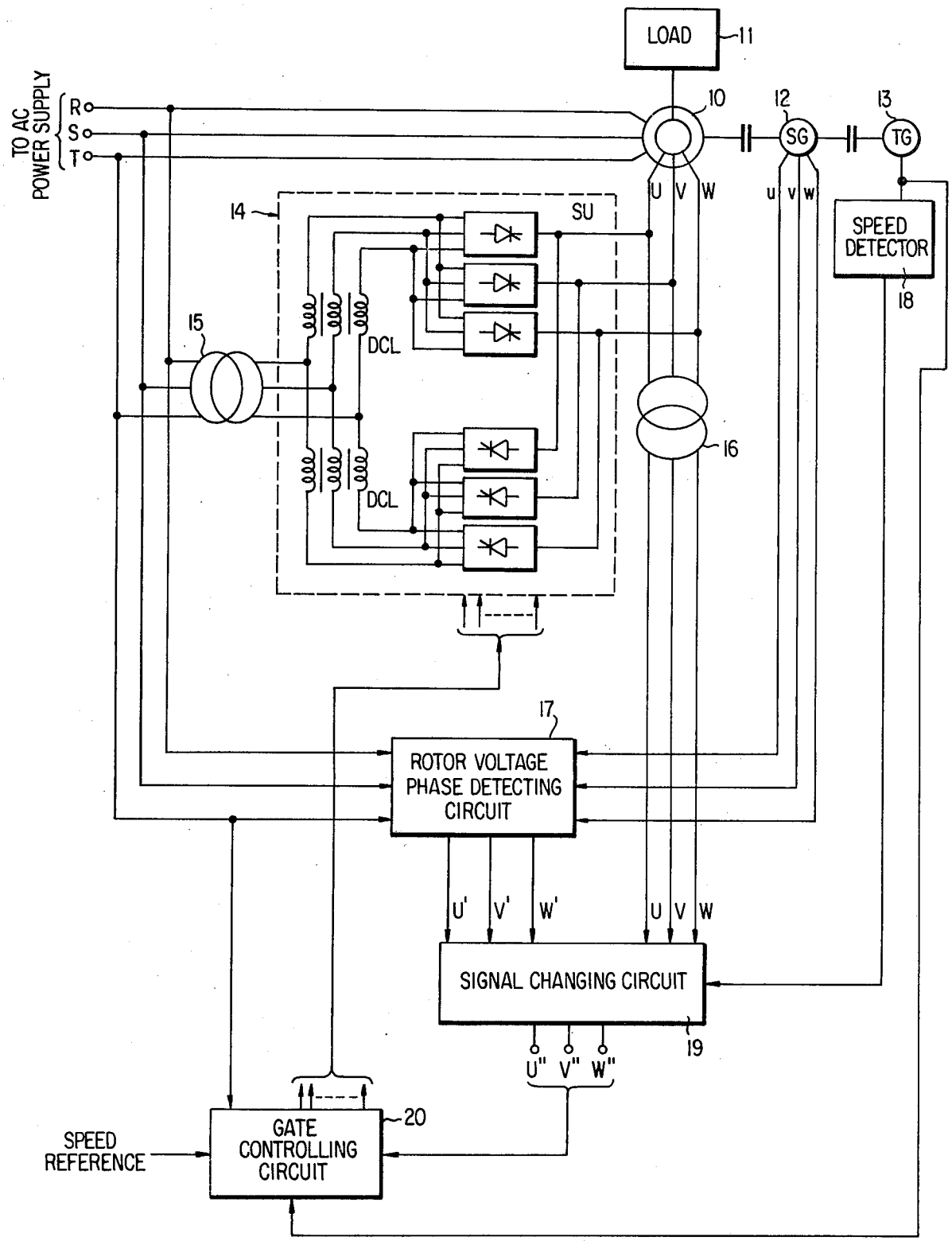
FIG. 1 shows a block diagram of a super-synchronous Scherbius apparatus according to the invention.

Referring now to the drawings, wherein like reference numerals designate identical or corresponding parts throughout the several views, and more particularly to FIG. 1 thereof, a super-synchronous Scherbius apparatus according to the invention is shown.

It is believed helpful to first explain the principles upon which the invention is based.

Assuming that $w1$ represents the angular frequency of the primary voltage of the induction motor and $s$ represents the slip, the angular frequency of the secondary rotor voltage may be designated $s \cdot w1$.

Assuming that $w2$ represents a rotating angular velocity, the relationship between $s \cdot w1$ and $w2$ is:

$$s \cdot w1 = w1 - w2 \qquad (1)$$

Therefore, assuming that $ws$ equals $s \cdot w1$, the change of the phase of the secondary rotor voltage is represented as $\cos wst$ which is expanded as follows:

$$\cos wst = \cos (w1 - w2)t = \cos w1t \cdot \cos w2t + \sin w1t \cdot \sin w2t \qquad (2)$$

As appears from equation 2, the secondary rotor voltage can be obtained by calculating the phase of the primary voltage or the rotating magnetic field generated by the primary voltage according to the angular frequency $w1$ and the position of the secondary rotor according to the angular frequency $w2$ in response to the equation 2 after the phase and the position are detected.

With reference to FIG. 1, numeral 10 denotes a three phase type induction motor having stator and rotor windings. The shaft of the induction motor 10, driven by a three phase A.C. power supply, is mechanically coupled to a load 11, a synchronous generator 12 having same number of poles as the induction motor and a tachogenerator 13.

The synchronous generator 12 obtains an output voltage having an angular frequency and an amplitude proportional to the rotating speed of the induction motor 10. The phase of the synchronous generator 12 is used to detect the position of the rotor because the instant value of the voltage depends on the position of the rotor.

A cycloconverter unit 14, which comprises a plurality of thyristor units SU and a plurality of D.C. reactors DCL, is connected between the rotor windings of the induction motor 10 and a transformer 15 connected to the A.C. power supply to control the secondary power generated at the rotor winding.

Although a transformer 16 connected to the rotor is used to obtain the voltage of the rotor windings within the range of relatively large values of slip, it is not an integral part of applicant's invention.

Figure 2:
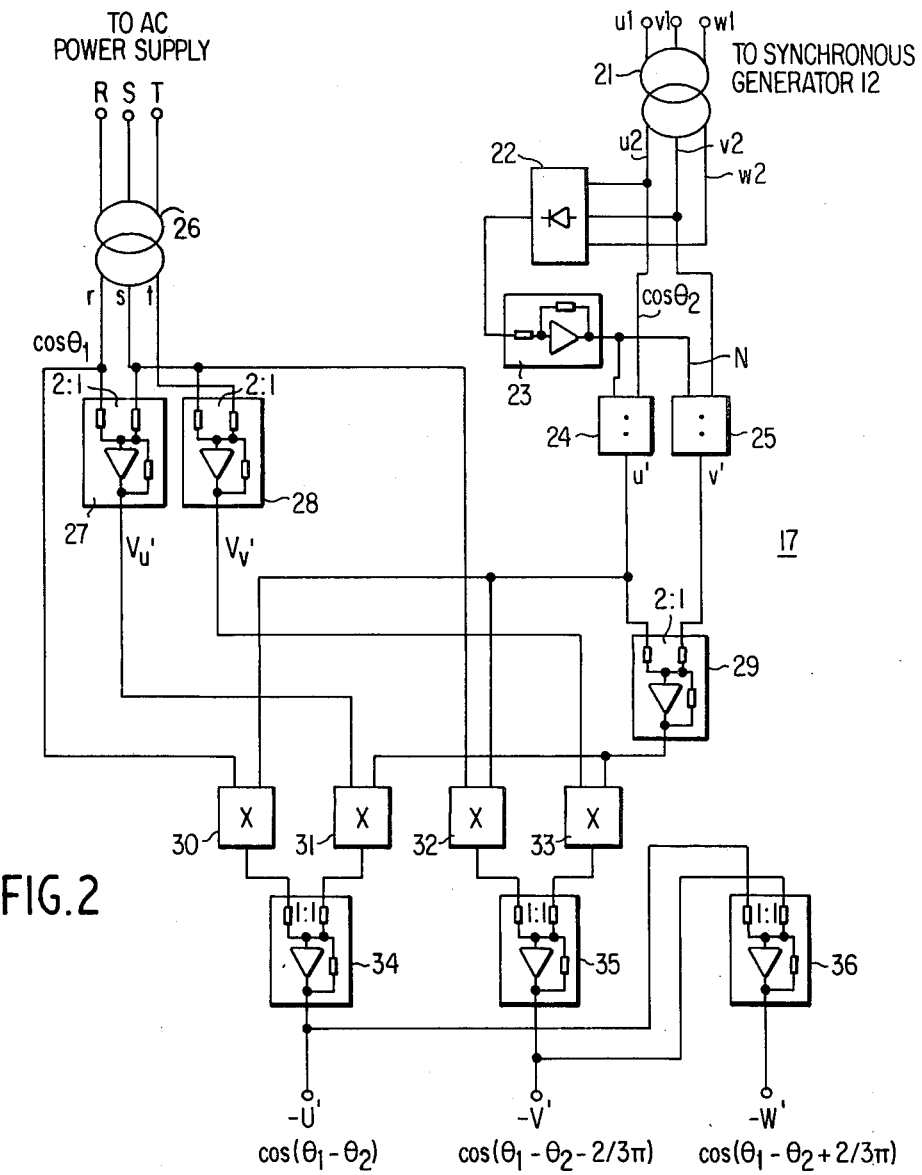
FIG. 2 is a schematic circuit diagram of the rotor voltage phase detection circuit shown in FIG. 1.

Numeral 17, as will be discussed more fully hereinafter with reference to FIG. 2, is a rotor voltage phase detecting circuit for detecting the phase of the rotor voltage at a speed including the synchronous speed but excepting the no rotation state during the supplying of the A.C. output U, V and W from the synchronous generator 12 using the A.C. output R, S and T from the A.C. power supply as an input signal.

A speed detector 18 connected to the D.C. output of the tachogenerator detects when the speed of the induction motor 10 deviates from the predetermined value, such as, by about 5% of the synchronous speed.

Figure 3:
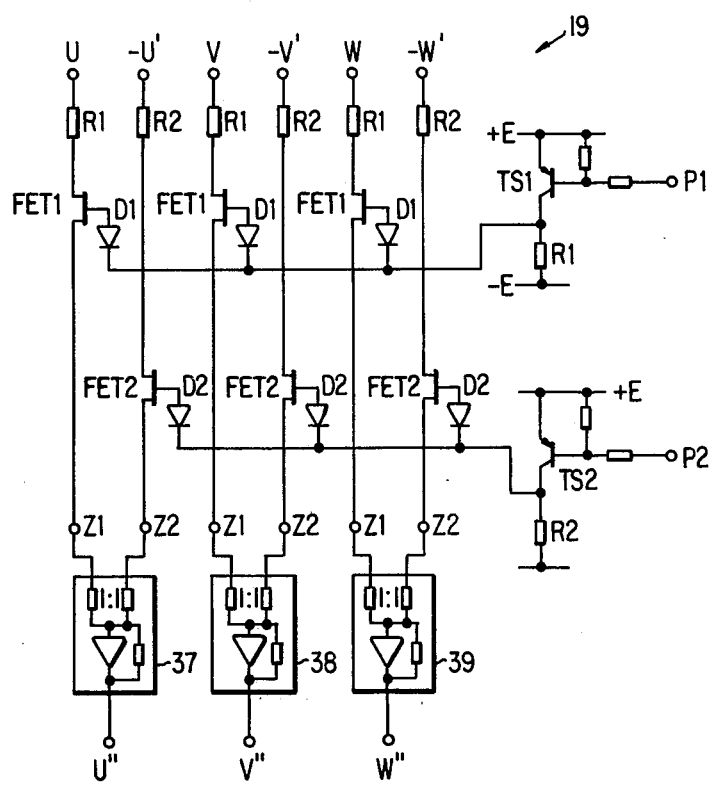
FIG. 3 is a schematic circuit diagram of the signal changing circuit shown in FIG. 1.

A signal changing circuit 19, described more fully hereinafter with reference to FIG. 3, is used to change the A.C. output of the transformer 16 and the A.C. output of the rotor voltage phase detecting circuit 17 in accordance with the output of the speed detector 18.

A speed reference signal, a feed-back signal from the tachogenerator 13, the rotor voltage phase signal from the signal changing circuit 19 and a voltage phase signal of the power supply are applied to gate controlling circuit 20 for controlling the gates of thyristor units SU of cycloconcerter 14 as described more fully hereinafter with reference to FIG. 4.

As described above, since the phase of the rotor voltage can be detected over the entire range of the speed, the speed of the induction motor 10 can be controlled below and above the synchronous speed by power-backing secondary power to the A.C. power supply through the cycloconverter 14 and the transformer 15 or by supplying the secondary power to the rotor windings.

Referring now to FIG. 2, the rotor voltage phase detecting circuit 17 will be more particularly described.

In order to obtain the voltage signals $u'$ and $v'$ from the A.C. voltages $u1$, $v1$ and $w1$ free from the speed of the induction motor, the A.C. voltages $u2$, $v2$ and $w2$ are converted into a D.C. speed signal N through a transformer 21, a full-wave rectifier 22 and an operational amplifier 23.

In this way, the D.C. speed signal N is supplied to the input terminals of dividers 24 and 25. A.C. outputs $u2$ and $v2$ of the transformer 21 are supplied to other input terminals of the dividers 24 and 25.

The dividers 24 and 25 divide the A.C. outputs $u2$ and $v2$ by the D.C. speed signal N.

Accordingly, amplitudes of the A.C. output $u'$ and $v'$ of the dividers 24 and 25 are not influenced by the speed deviation of the induction motor 10. However, the phases of the A.C. outputs $u'$ and $v'$ are changed in accordance with the rotating angular velocity of the induction motor 10.

Although a cosine function term in the above mentioned equation (2) can be calculated by using the A.C. outputs $u'$ and $v'$ and the A.C. outputs $r$ and $s$ of the transformer 26, a sine function term in the equation (2) is necessary to prepare the following arrangement in order to correct the phase.

Since the phase of the sine function lags 90° behind that of the cosine function, an arrangement for converting the cosine function to a sine function is necessary.

Such conversion can be accomplished in various manners. However, the converting arrangement in this invention utilizes the operational amplifiers 27, 28 and 29.

In order to obtain a vector signal having a phase lag of 90° with respect to the cosine function or the sine function, the base vector signal may be multiplied by the coefficient ½ and the result added to the next base vector signal having a phase lag of 90° with respect to the former base vector signal and the result multiplied by a coefficient $2/\sqrt{3}$.

Thus the operational amplifier 27, supplied with the A.C. outputs $r$ and $s$ of the transformer 26, is used for converting the voltage V, for example $V\cos\theta1$, to the voltage $V\sin\theta1$.

In the same manner, the operational amplifier 28, supplied with the A.C. outputs $s$ and $t$, is used for converting the voltage V, for example $V\cos(\theta1 - \frac{2}{3}\pi)$, to the voltage $V\sin(\theta1 - \frac{2}{3}\pi)$.

The operational amplifier 29, supplied with the A.C. outputs $u'$ and $v'$, is used for converting the voltages $Vu'$ and $Vv'$, for example $Vu'\cos\theta2$ and $Vv'\cos(\theta2 - \frac{2}{3}\pi)$, to the voltage $Vv'\sin\theta2$.

A multiplier 30, supplied with the A.C. output signals $r$ and $u'$ as input signals, produces a signal, such as $\cos\theta1\cdot\cos\theta2$, as shown in equation (2).

In the same manner, multipliers 31, 32, and 33 produce signals, such as $\sin\theta1\cdot\sin\theta2$, $\cos(\theta1 - \frac{2}{3}\pi)\cdot\cos\theta2$ and $\sin(\theta1 - \frac{2}{3}\pi)\cdot\sin\theta2$.

Thus, an adder 34, supplied with the A.C. output signals of the multipliers 30 and 31, produces an output signal $-U'$ of $V\cos(\theta1-\theta2)$ corresponding to the relative position of the rotor coil with respect to the rotating magnetic field. An adder 35, supplied with the A.C. output signals of the multipliers 32 and 33, produces an output signal $-V'$ of $V\cos(\theta1-\theta2\,\frac{2}{3}\pi)$.

The output signal $-W'$ ($= -V\cos(\theta1-\theta2 + \frac{2}{3}\pi)$) can be obtained by adding the signals $-U'$ and $-V'$ by means of an adder 36.

Referring now to FIG. 3, terminals $-U$, $-V$ and $-W$, connected to the output terminals, U, V and W of the transformer 16 shown in FIG. 1, are connected to input terminals corresponding to the operational amplifiers 37, 38 and 39 through resistors R1, field effect transistors (source-drain) FET1 and terminals Z1.

Terminals −U', −V' and −W', connected to the output terminals U', V' and W' of the rotor voltage detecting circuit 17, are connected to input terminals corresponding to operational amplifiers 37, 38 and 39 through resistors R2, field effect transistors (source-drain) FET2 and terminals Z2. Gates of the field effect transistors FET1 and FET2 are connected to collector terminals of switching transistors TS1 and TS2 through diodes D1 and D2, respectively. The base terminals of switching transistors TS1 and TS2 are connected to respective switching control signal terminals P1 and P2 through suitable resistors.

When the speed detector 18 does not generate an output, a switching control signal is applied to the terminal P1 to cause the field effect transistor FET1 to conduct.

Reversely, when the speed detector 18 generates an output, a switching control signal is applied to the terminal P2 to cause the field effect transistor FET2 to conduct. Thus, the outputs of the transformer 16 and the rotor voltage detecting circuit 17 are exchanged by means of the switching control signal to be applied to the terminal P1 or P2.

It will be understood that the output of the speed detector 18 is supplied to the terminal P1 or P2 by means of a suitable switching circuit such as a flip-flop (not shown).

Figure 4:
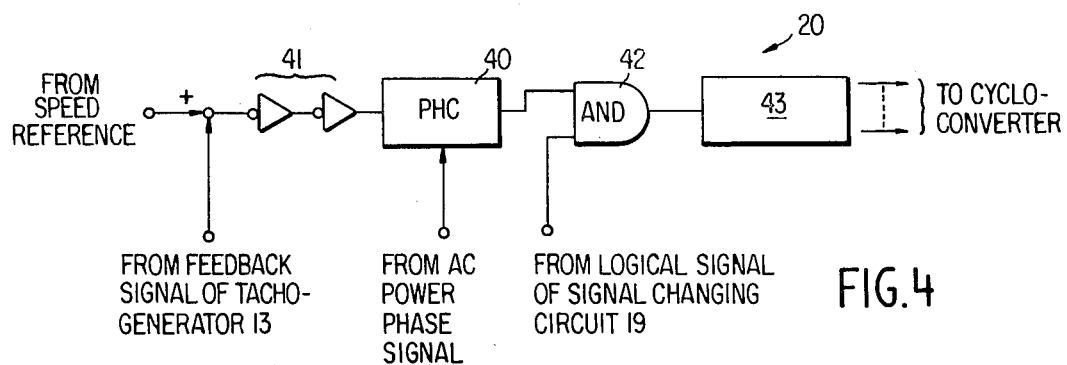
FIG. 4 is a schematic circuit diagram of the gate controlling circuit shown in FIG. 1.

FIG. 4 shows a schematic circuit diagram of the gate controlling circuit 20 shown in FIG. 1.

A speed reference signal conflicts with a feedback signal from the tachogenerator 13 and the conflicting result is applied to the phase controlling circuit 40 through operational amplifiers 41 for controlling the speed and the current (the current feedback signal is not shown).

Here, the A.C. output signal of the operational amplifier 41 is converted into a logical signal in response to the A.C. power phase signal.

The logical signal of the phase controlling circuit 40 is applied to one input terminal of AND gate 42. The logical signal representing the secondary voltage phase signal of the signal changing circuit 19 is applied to the other input terminal of the AND gate 42. A logical output signal of the AND gate 42 is applied to the driver 43 for driving the cycloconverter 14.

In this manner, the gate controlling circuit 20 generates signals corresponding to the gate of the thyristor unit SU in accordance with the speed reference signal.

Figure 5:
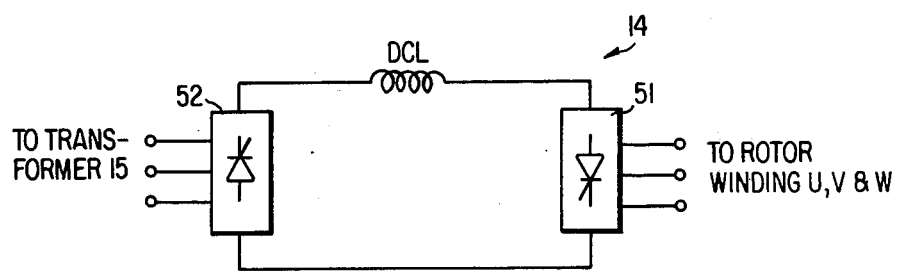
FIG. 5 is a schematic circuit diagram of another embodiment of the cycloconverter shown in FIG. 1.

FIG. 5 shows a schematic circuit diagram of another embodiment of the cycloconverter unit 14 shown in FIG. 1.

A.C. terminals of the first and second converters 51 and 52, reversible as rectifier or inverter, are connected to the terminals U, V and W of the rotor winding and the secondary terminals of the transformer 15, respectively. The converter 51 cannot be used at a synchronous speed without a forced commutation circuit.

The secondary power in either the forward or backward direction can be controlled through the first and second converters 51 and 52 by suitable controlling signals.

In this manner, the secondary voltage phase signal of the signal changing circuit 19 is applied to the gate terminals of the first converter 51.

The speed reference signal controlled by the A.C. power phase signal, such as the logical signal to the phase controlling circuit 40 as shown in FIG. 4, is applied to the gate terminals of the second converter 52.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by letters patent of the United States is:

1. A controlling apparatus for a supersynchronous Scherbius apparatus to enable wound rotor type induction motors to have a smooth speed control below and above the synchronous speed comprises first detecting means for detecting a signal corresponding to the rotating magnetic field of the induction motor, second detecting means for detecting a signal corresponding to the position of the rotor, calculating means for generating a signal corresponding to the phase of the secondary voltage in accordance with the signals of the first and the second detecting means, power converting means for reversibly converting the power of a secondary winding of the induction motor to the power of an A.C. power supply, and power controlling means for controlling the power converting means in accordance with the signal of the calculating means.

2. A controlling apparatus according to claim 1 further comprising speed detecting means for detecting the speed of the induction motor, secondary winding voltage detecting means for detecting a signal of the secondary winding, and means for switching the signal of the calculating circuit to the signal of the secondary winding voltage detecting means in response to an output of the speed detecting means.

3. A controlling apparatus according to claim 2 wherein the means for switching switches to the signal of the calculating means except for the starting period of the induction motor and switches to the signal of the secondary winding voltage detecting means during the starting period of the induction motor.

4. A controlling apparatus according to claim 1 wherein the power converting means comprises a plurality of thyristors and a plurality of smoothing reactors.

5. A controlling apparatus according to claim 4 wherein the power converting means comprises a cycloconverter.

6. A controlling apparatus according to claim 4 wherein the power converting means comprises two converters having a rectifying and an inverting function.

7. A controlling apparatus according to claim 1 further comprising a transformer provided between the power converting means and the A.C. power supply.

8. A controlling apparatus according to claim 1 wherein the second detecting means is a synchronous generator having the same number of poles as the induction motor.

9. A controlling apparatus according to claim 1 wherein the calculating means comprises two transformers, a fullwave rectifier, two dividers, three phase-shifters, four multipliers and three adders.

10. A controlling apparatus according to claim 2 wherein the means for switching comprises a plurality of field effect transistors, a plurality of diodes and two switching transistors having input terminals for receiving the switching control signals.

11. A controlling apparatus according to claim 1 wherein the power controlling means comprises two operational amplifiers for amplifying the speed and the current signals, a phase controlling circuit, an AND logic circuit and a driving circuit.

* * * * *